(12) United States Patent
Umezawa (10) Patent No.: US 7,855,494 B2
(45) Date of Patent: Dec. 21, 2010

(54) FILM-PROVIDED MOLDED PIECE, METHOD FOR AND APPARATUS FOR PRODUCING THE SAME

(75) Inventor: Takao Umezawa, Maebashi (JP)

(73) Assignee: Mitsuba Corporation, Kiryu-shi (JP)

( * ) Notice: Subject to any disclaimer, the term of this patent is extended or adjusted under 35 U.S.C. 154(b) by 713 days.

(21) Appl. No.: 11/885,445

(22) PCT Filed: Mar. 14, 2006

(86) PCT No.: PCT/JP2006/304964

§ 371 (c)(1),
(2), (4) Date: Aug. 31, 2007

(87) PCT Pub. No.: WO2006/098302

PCT Pub. Date: Sep. 21, 2006

(65) Prior Publication Data

US 2009/0243460 A1      Oct. 1, 2009

(30) Foreign Application Priority Data

Mar. 15, 2005   (JP)   ............................. 2005-072898

(51) Int. Cl.
*H01J 9/24* (2006.01)
*H01J 1/70* (2006.01)
*H01J 5/16* (2006.01)
*B29C 59/00* (2006.01)

(52) U.S. Cl. ...................... 313/113; 445/22; 264/129; 264/135; 425/90; 425/96

(58) Field of Classification Search ................. 313/489, 313/635, 110–117; 425/90–106; 264/135, 264/129; 445/22
See application file for complete search history.

(56) References Cited

U.S. PATENT DOCUMENTS 6,428,730 B1 *   8/2002   Nishida ...................... 264/255

FOREIGN PATENT DOCUMENTS

| EP | 727677 A1 * | 8/1996 |
|---|---|---|
| JP | A-6-147069 | 5/1994 |
| JP | A-6-169191 | 6/1994 |
| JP | 2004338328 A * | 12/2004 |
| JP | A-2004-338328 | 12/2004 |
| WO | WO 2004/101253 A1 | 11/2004 |

* cited by examiner

*Primary Examiner*—Mariceli Santiago
(74) *Attorney, Agent, or Firm*—Oliff & Berridge, PLC (57) ABSTRACT

An electric connection part between a bulb and a terminal is masked without using a special masking material when a lamp unit is produced through a primary injection step of molding a lamp main body and a lens part while using a movable mold and a fixed mold, a film forming step of covering the lamp main body with a film, and a secondary injection step of uniting the lamp main body and the lens part together with a resinous material. The bulb is incorporated through a step set between the primary injection step and the film forming step. In the state in which the bulb is incorporated in the lamp main body, the surface of the top of the bulb is covered with a film, and a part hidden by the shadow of the film is masked, and hence electric insulation properties are secured.

6 Claims, 6 Drawing Sheets

FILM-PROVIDED MOLDED PIECE, METHOD FOR AND APPARATUS FOR PRODUCING THE SAME

This application is the U.S. National Stage of PCT/JP2006/304964, filed Mar. 14, 2006, which claims priority from JP2005/072898, filed Mar. 15, 2005, the entire disclosures of which are incorporated herein by reference hereto.

BACKGROUND

The present invention relates to a film-provided molded piece (i.e., a molded piece provided with a film), a method for producing the molded piece, and an apparatus for producing the molded piece.

Generally, as an example of a film-provided molded piece, an emblem is used as a vehicle component. The surface of a member is covered with a material having a coloring effect or a reflection effect so as to improve design characteristics. In order to produce this emblem, the surface of the member is plated with, for example, a decorative chrome film (see Japanese Published Unexamined Patent Application No. H6-147069, for example).

Hexavalent chromium used for plating is a substance harmful to humans, and results in environmental pollution. Therefore, nowadays, hexavalent chromium must conform to various regulations, and is thus not used.

As a countermeasure against this, there is a method in which a film is formed on the surface of a base member by a film forming device through a vacuum deposition step or a sputtering step, with the surface of the film covered with a resinous material (see Japanese Published Unexamined Patent Application No. H6-169191, for example).

However, according to this method, the base material that has undergone injection molding is extracted from an injection molding apparatus, and is then set in a vacuum deposition apparatus so as to be covered with a film. The base member covered with a film is then extracted from the vacuum deposition apparatus, and is then set in the injection molding apparatus so as to apply a resinous material onto the surface of the film in an injection molding manner. Therefore, this method has many steps, consumes a lot of time, and is inferior in operation efficiency. In addition, there are cases in which the film surface and the resin-covered surface are flawed, or are covered with dust, or are soiled with oil by contact with the hand of an operator with the surface during the extracting step, the setting step, and the apparatus-to-apparatus conveying step. Disadvantageously, it is impossible to produce a desired workpiece provided with a film. Inferior goods are created, thus leading to a low yield.

Therefore, a proposal has been made to produce a film-provided molded piece such that a film forming step of covering the first molded piece with a film is performed between a first injection step of molding first and second molded pieces and a second injection step of uniting the first and second molded pieces together so that a molded piece provided with a film can be formed through a series of steps. According to this proposal, it has become possible to achieve an improvement in workability, in yield, and in quality (see Wo2004/101253A1).

When the conventional film-provided molded piece is produced through the series of steps, if the film-provided molded piece is a lamp unit, and if there is a need to incorporate a bulb and terminals into the lamp unit, an incorporation part in which the bulb and the terminals are incorporated and placed is masked with a masking material in order to secure insulation properties, and a film is then formed. Thereafter, the bulb and the terminals are incorporated and placed into the incorporation part from which the masking material has been removed. However, according to this method, there is a need to prepare a masking material and to attach and remove the masking material. Therefore, disadvantageously, these operations must be performed with an automatic machine, such as a magic hand, and the apparatus is complicated.

If the film-provided molded piece is a "side winker," that is a lamp unit, if a film-forming material is aluminum by which the reflection function is heightened, and if the bulb is umber, the umber bulb appears at the center of the reflecting surface whose color is silver white. This is different from the color of the bulb, thus causing the sense of discomfort. In addition, reflection light generated when the winker is blinked is weak, and light emitted from the front edge of the bulb is brilliantly flashed. Therefore, disadvantageously, a balance in the entire light is lost. These problems, as well as other problems are solved by the present invention. The present invention also provides for various other advantages.

According to a first exemplary aspect of the present invention, an apparatus for producing a film-provided molded piece includes a first mold having mold faces by which first and second molded pieces are formed, a second mold having mold faces by which first and second molded pieces are formed, and a film forming device used to cover the first molded piece with a film. The apparatus is structured such that the film-provided molded piece is produced through a primary injection step of forming the first and second molded pieces by structuring the first and second molds so that the first mold can be relatively moved in a direction receding from and proceeding to the second mold and in a direction along a mold surface, a film forming step of covering the first molded piece with the film, and a secondary injection step of uniting the first and second molded pieces together. The film forming step is performed between the primary injection step and the secondary injection step. The apparatus is also structured such that when members are incorporated into the first molded piece, a member incorporating step of incorporating the members into the first molded piece is performed between the primary injection step and the film forming step. The apparatus is also structured such that surfaces of the members incorporated therein are covered with a film, and masking is performed by the surfaces of the members covered therewith.

According to a second exemplary aspect of the present invention, a method for producing a film-provided molded piece includes forming first and second molded pieces by structuring with first and second molds that are structured so that the first mold can be relatively moved in a direction receding from and proceeding to the second mold and in a direction along a mold surface, covering the first molded piece with a film, and a secondary injection step of uniting the first molded piece that is covered with the film and the second molded pieces piece together. A film forming step of covering the first molded piece with a film. The film forming step being performed between the primary injection step and the secondary injection step. The first mold having mold faces by which the first and second molded pieces are formed. The second mold having mold faces by which the first and second molded pieces are formed and a film forming device used to cover the first molded piece with the film. When members are incorporated into the first molded piece, a member incorporating step of incorporating the members are incorporated into the first molded piece after the first molded piece is formed but before the first molded piece is covered with the film is performed between the primary injection step and the film forming step, and surfaces of the members incorporated therein are covered with films, and masking is performed by the surfaces of the members covered therewith.

According to a third exemplary aspect of the present invention, a film-provided molded piece is formed through a primary injection step of forming first and second molded pieces by structuring first and second molds so that the first mold can be relatively moved in a direction receding from and proceeding to the second mold and in a direction along a mold surface, a secondary injection step of uniting the first and second molded pieces together, and a film forming step of covering the first molded piece with a film. The film forming step is performed between the primary injection step and the secondary injection step. The first mold has mold faces by which the first and second molded pieces are formed. The second mold has mold faces by which the first and second molded pieces are formed and a film forming device used to cover the first molded piece with the film. In the thus structured film-provided molded piece, when members are incorporated into the first molded piece, a member incorporating step of incorporating the members into the first molded piece is performed between the primary injection step and the film forming step. Surfaces of the members incorporated therein are covered with a film, and masking is performed by the surfaces of the members covered therewith.

According to exemplary aspects of the present invention, the surface of a member incorporated in the first molded piece is covered with the same film with which the first molded piece is covered. Therefore, if the second molded piece is transparent so that the inside of the lamp unit can be seen from outside, the film of the member incorporated in the first molded piece has the same color as the film of the first molded piece, and the sense of discomfort is never caused. In addition, since masking is performed with the film, it becomes unnecessary to troublesomely perform masking by using a special masking material.

According to exemplary aspects of the present invention, the film of the top of the bulb of the lamp unit has the same color as the film of the lamp main body serving as a reflecting surface. Therefore, the sense of discomfort is not caused, and, in addition, light emitted outwardly from the top of the bulb is restrained or weakened. This makes it possible to avoid a situation in which only the top of the bulb is particularly brightened, and masking necessary for electric insulation can be achieved by the bulb. Additionally, light reflected by the film of the top of the bulb reaches the film of the lamp main body, and is reflected by this film. As a result, reflected light radiating from the lamp unit is dispersed, and hence the lamp unit can has excellent reflection efficiency.

BRIEF DESCRIPTION OF THE DRAWINGS

Various exemplary embodiments will be described with reference to the drawings, wherein.

DETAILED DESCRIPTION OF EMBODIMENTS

Figure 1:
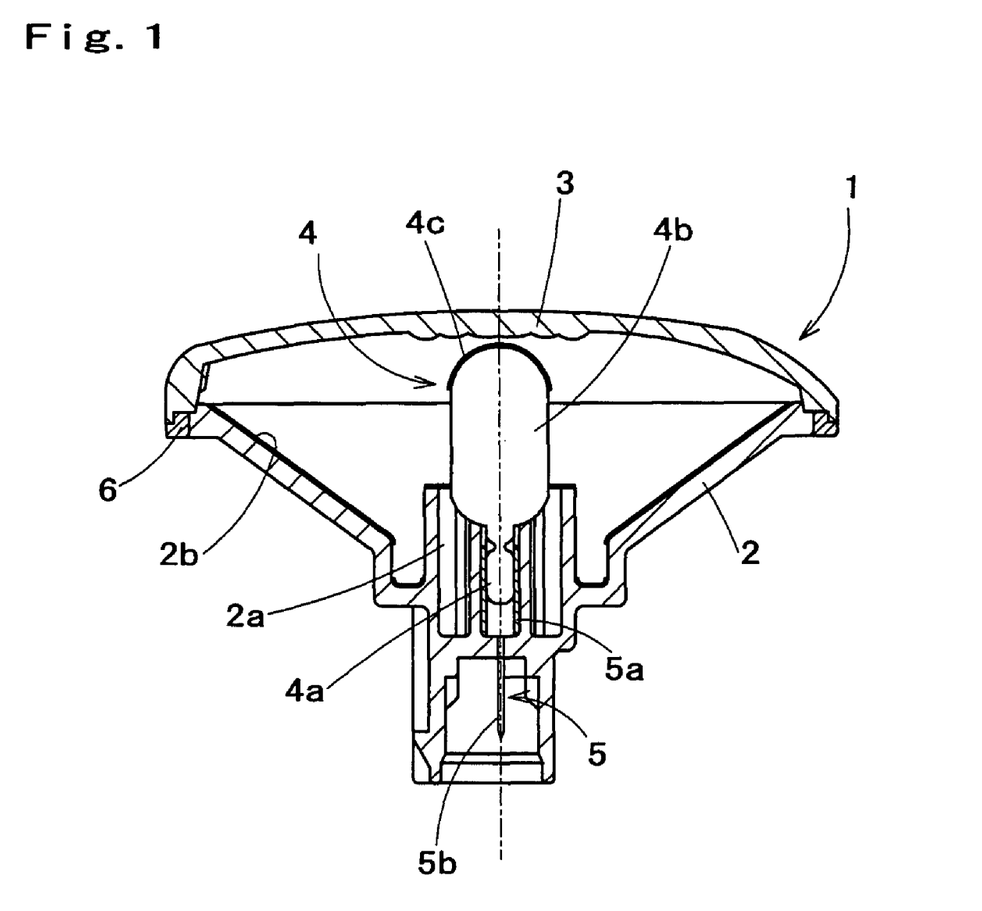
FIG. 1 is a longitudinal sectional view of a lamp unit.
Figure 2:
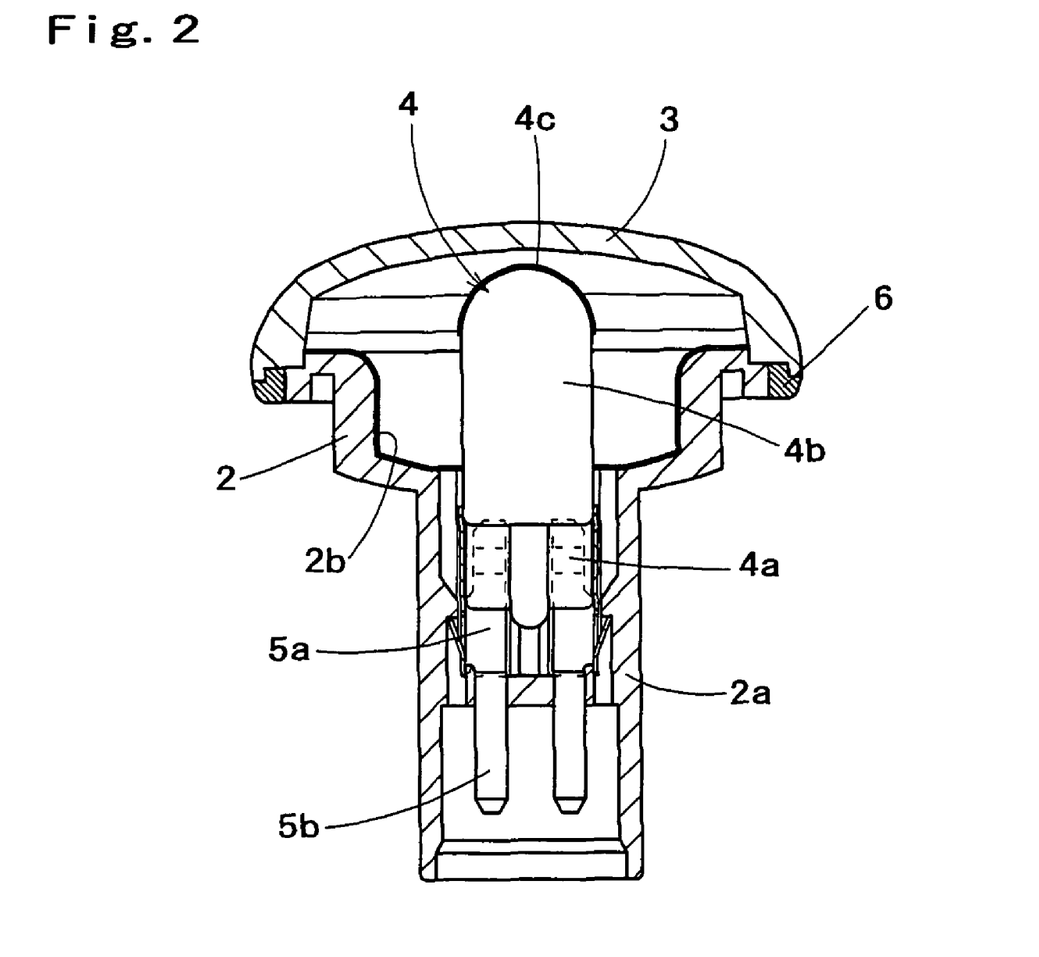
FIG. 2 is a cross-sectional view of the lamp unit.

An embodiment of the present invention will be hereinafter described with reference to the accompanying drawings. In FIGS. 1 and 2, reference numeral 1 designates a lamp unit that is used to make a side turn signal and that is an example of a film-provided molded piece (i.e., a molded piece provided with a film). The lamp unit 1 is produced by uniting a lamp main body (first molded piece) 2 and a lens part (second molded piece) 3, both of which are molded through a primary injection step, together with a resinous material 6 injected during a secondary injection step. The lamp main body 2 has a member incorporation portion 2a into which a bulb 4 and a terminal 5, which are to-be-incorporated members, are incorporated. The lamp unit 1 is produced by undergoing a member incorporating step and a film forming step in this order, as described later, between the primary injection step and the secondary injection step.

In this case, the bulb 4 is made up of a bulb-side connection portion 4a and a light emitting portion 4b. The bulb-side connection portion 4a is inserted into the member incorporation portion 2a and is then electrically connected to the terminal 5. The light emitting portion 4b has a first part inserted into the member incorporation portion 2a and a second part projecting from the end of the member incorporation portion 2a toward the lens part 3. On the other hand, the terminal 5 is made up of a terminal-side connection portion 5a and an external connection portion 5b. The terminal-side connection portion 5a is bent in an angular U shape when planarly viewed (i.e., when viewed from the side of the lens part 3) and is electrically connected to the bulb-side connection portion 4a fitted in the terminal-side connection portion 5a in the member incorporation portion 2a. The external connection portion 5b is electrically connected to a terminal provided in an external socket (not shown).

Figure 6:
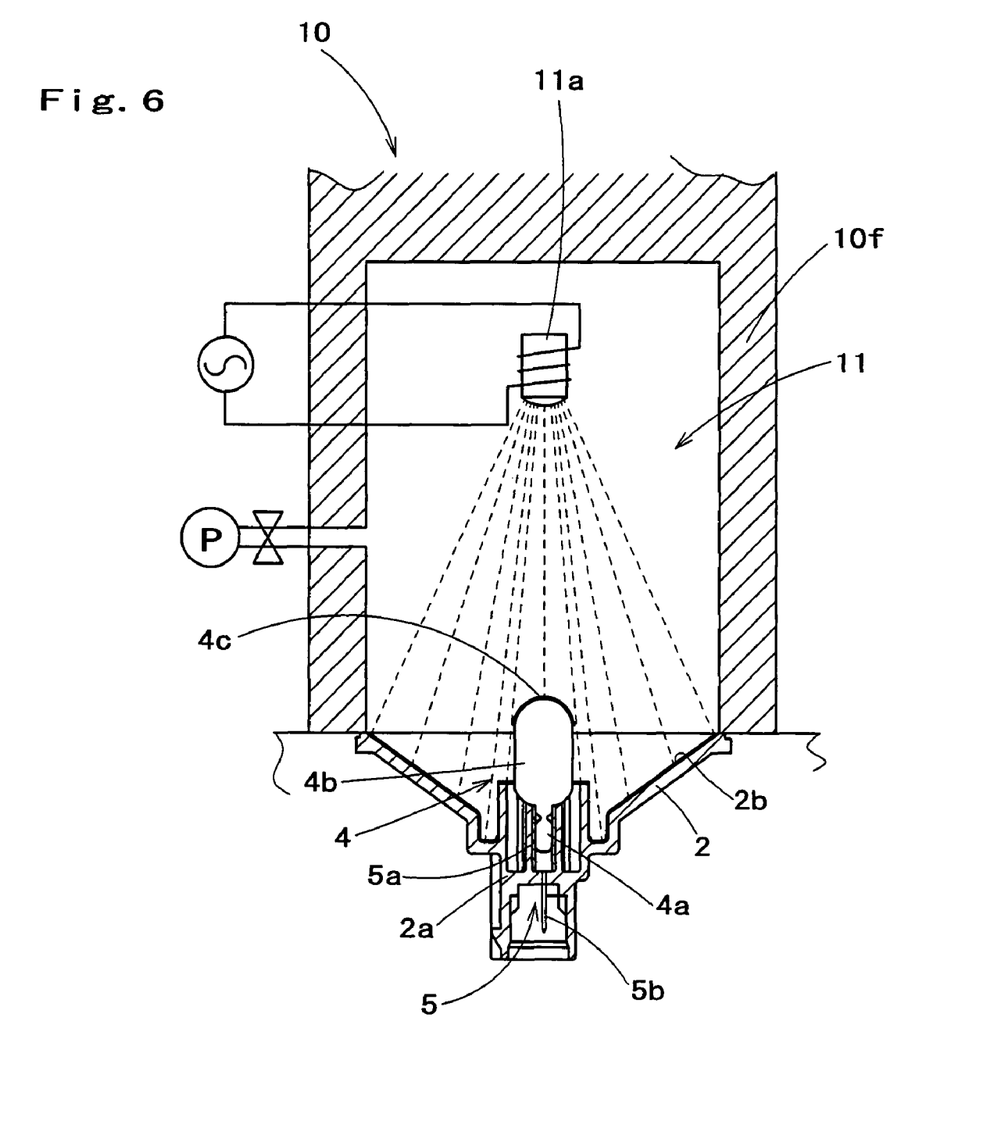
FIG. 6 is a schematic view showing a film forming step of the lamp unit.

During the film forming step described later, a part hidden in the shadow of the light emitting portion 4b, as well as the outer wall of the member incorporation portion 2a, is prevented from being covered with a film as shown in FIG. 6. An interior of the member incorporation portion 2a is thus not covered with the film. As a result, the bulb 4 serves as a masking material, and an insulating state is maintained between the terminal-side connection portion 5a and the bulb-side connection portion 4a without making a plus-minus electric connection therebetween. Additionally, the top of the light emitting portion 4b is covered with a film 4c.

Figure 3:
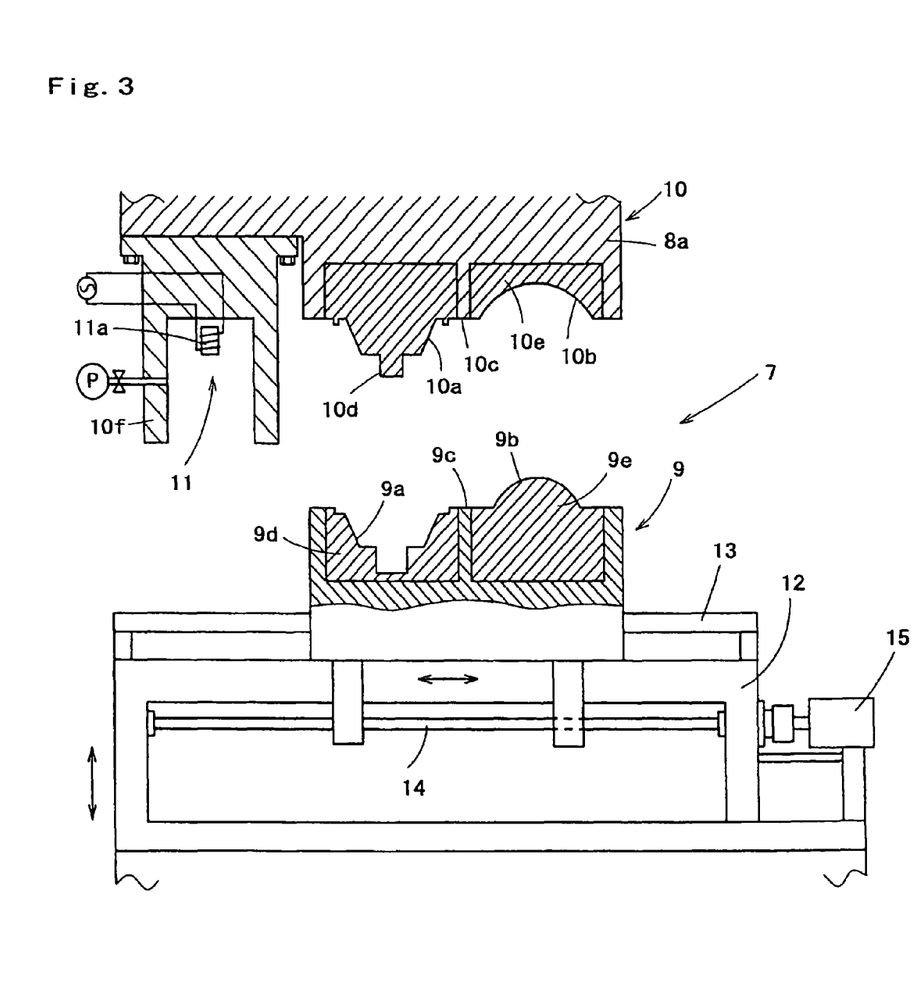
FIG. 3 is a schematic view of an apparatus for producing a film-provided molded piece.

Next, a description will be given of an apparatus 7 for producing the lamp unit 1. In FIG. 3 the apparatus 7 is made up of a movable mold 9 and a fixed mold base 8a described later. Molds 9d and 9e having mold faces 9a and 9b, respectively, by which the lamp main body 2 and the lens part 3 are molded are detachably attached to the movable mold 9. These form a part of the movable mold 9 (corresponding to a first mold of the present invention).

On the other hand, molds 10d, 10e and a film forming mold 10f are detachably attached to the fixed mold base 8a. The molds 10d and 10e have mold faces 10a and 10b, respectively, by which the mold lamp main body 2 and the lens part 3 are molded. The film forming mold 10f includes a film forming device 11 (i.e., device for forming a film according to a vacuum deposition method or a sputtering vapor deposition method) disposed contiguous to the mold 10d used to form a lamp main body. These are aligned with each other. The molds 10d, 10e and the film forming mold 10f form a part of the fixed mold 10 of the present invention (corresponding to a second mold of the present invention). In this embodiment, the molds 9d and 9e of the movable mold 9 are structured to be separated from each other, and the molds 10d, 10e and the film forming mold 10f of the fixed mold 10 are also structured to be separated from each other. However, these can be structured to be integral with each other, of course.

The film forming device 11 can be, of course, made as a continuously film-forming device in which plating is performed with a film of metal, such as aluminum or copper, and then a protection film of, for example, an anti-oxidizing material is applied onto the metal film so as to protect this film for antioxidation. It is known that the film forming device 11 has a superior rectilinear progression capability when a film is applied onto an object to be coated with a film, and hence the film forming device 11 is inferior in the application of a film onto a vertical surface.

In this case, the film forming mold 10f provided on the fixed mold 10 is designed to project toward the movable mold 9 so as to be greater than the sum of a projection amount from a mold surface 10c of the convex mold face 10a used to form the surface (inner surface) of the lamp main body 2 that is covered with a film 2b and a projection amount from a mold surface 9c of the convex mold face 9b provided on the movable mold 9 used to form the inner surface of the lens part 3, so that the mold faces 10a and 9b do not interfere with each other during the film forming step described later.

The movable mold 9 is placed on a mounting base 12 by which the fixed and movable molds are allowed to recede from and proceed to each other using an actuator (servo motor or cylinder) not shown. The mounting base 12 has a guide rail 13 used to move and guide the movable mold base 9, a screw rod 14 screwed to the movable mold base 9, and an actuator (typified by a servo motor) 15 used to rotate the screw rod 14 positively and negatively. The movable mold base 9 is moved while the actuator 15 is controllably driven, and, as a result, the movable mold 9 can be controllably moved and positioned to each position to be occupied during the primary and secondary injection steps and the film forming step.

Next, a description will be given with use of FIGS. 4A-4D and 5A-5D of a step of producing the lamp unit 1. First, the movable mold 9 is moved toward the fixed mold 10 in a mold separation state in which the mold faces 9a and 9b face the mold faces 10a and 10b, respectively, of the fixed mold 10 (see FIGS. 4A and 4B). The movable and fixed molds 9 and 10 are then matched with each other, and, in this state, a primary injection step is performed in which the lamp main body 2 and the lens part 3 are formed (see FIG. 4B).

Figure 4A:
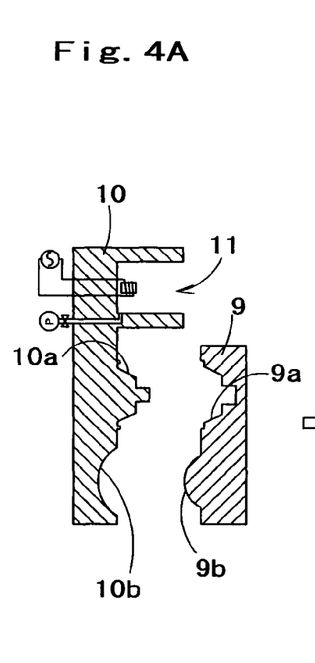
FIG. 4A to FIG. 4D are schematic views showing a first-half production process for producing a film-provided molded piece.
Figure 4B:
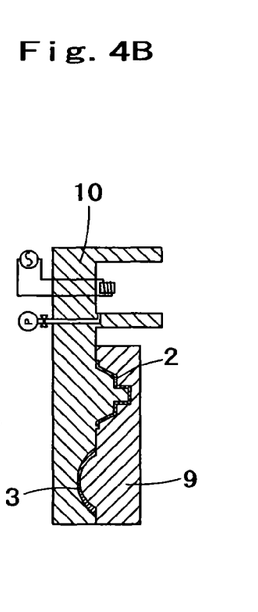
Figure 4C:
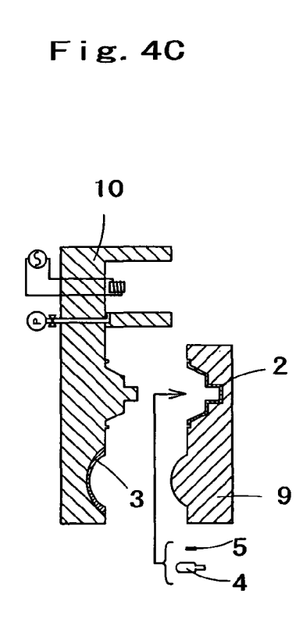
Figure 4D:
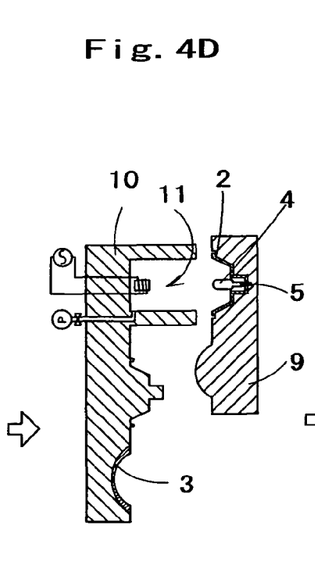

Thereafter, the movable mold 9 is moved in a mold separation direction to recede from the fixed mold 10 (see FIG. 4C). The lamp main body 2 is designed to remain on the side of the movable mold 9, whereas the lens part 3 is designed to remain on the side of the fixed mold 10 at this time. In this mold separation state, an automatic control machine, such as a magic hand (manipulator), not shown, enables the performance of a member incorporating step in which the terminal 5 and the bulb 4 are inserted into the member incorporation portion 2a of the lamp main body 2 so as to be incorporated in the lamp main body 2 (see FIG. 4D).

Figure 5A:
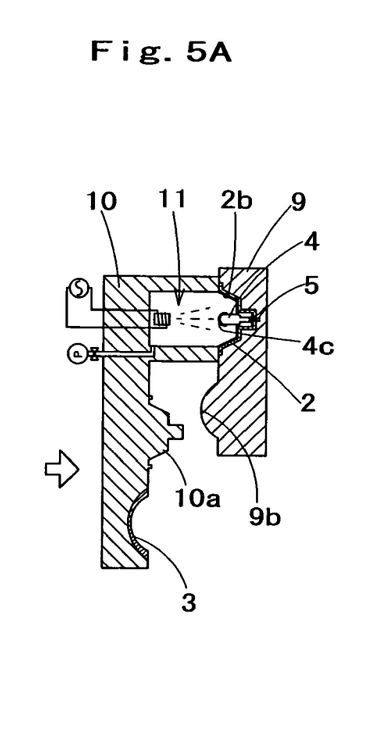
FIG. 5A to FIG. 5D are schematic views showing a latter-half production process for producing the film-provided molded piece.
Figure 5B:
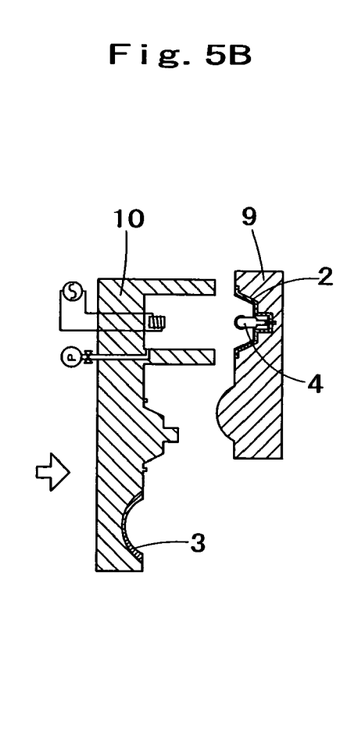
Figure 5C:
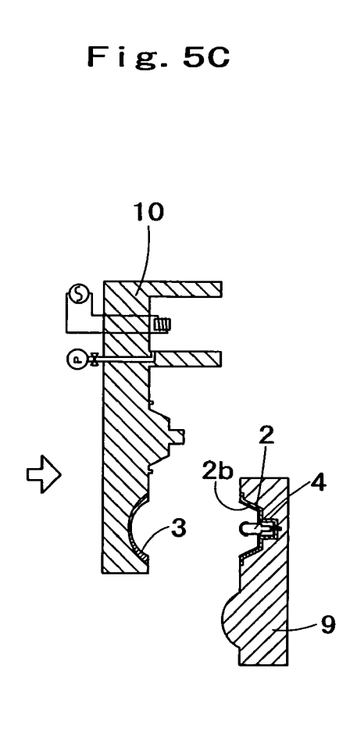
Figure 5D:
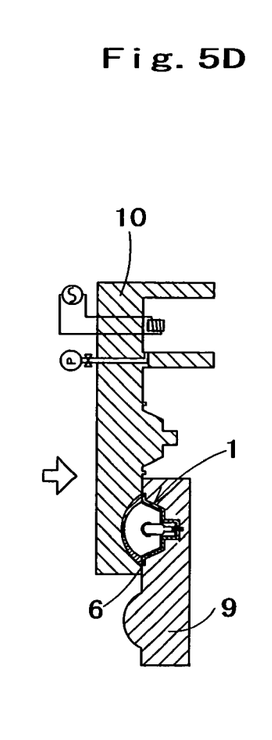

Thereafter, the movable mold 9 is moved in a direction (leftwardly in the drawing) along the mold surface so that the lamp main body 2 faces the film forming device 11 (see FIG. 5A). The movable mold 9 is then moved in the mold matching direction, and the lamp main body 2 is matched with the film forming device 11. Thus, the surface of the lamp main body 2 that has been separated from the mold face 10a is covered with a film 2b using a spray 11a. Furthermore, the top of the bulb 4 is covered with a film 4c (see FIG. 5A). Thereafter, the movable mold 9 is moved in the mold separation direction to be separated from the film forming device 11 (see FIG. 5B), and is moved in the direction (rightwardly in the drawing) along the mold surface 9c, so that the lamp main body 2 and the lens part 3 face each other (see FIG. 5C). In this state, a secondary injection step is performed in which the molds 9 and 10 are matched with each other, and the lamp main body 2 and the lens part 3 are united together with a resinous material 6 so as to produce the lamp unit 1 (see FIG. 5D). Thereafter, the movable mold 9 is moved in the mold separation direction, and the lamp unit 1 is extracted. The movable mold 9 is then moved in the direction (leftwardly in the drawing) along the mold surface so that the mold faces 9a and 9b of the movable mold 9 face the corresponding mold faces 10a and 10b, respectively, of the fixed mold 10. The lamp unit 1 can be successively produced by repeatedly performing this series of steps.

In the embodiment of the present invention structured as above, the lamp unit 1 is produced by undergoing the primary injection step of molding the lamp main body 2 and the lens part 3, the film forming step of covering the lamp main body 2 with a film, and the secondary injection step of uniting the lamp main body 2 and the lens part 3 together. In this case, the step of incorporating the terminal 5 and the bulb 4 each of which is a member to be incorporated into the lamp main body 2, is performed between the primary injection step and the film forming step, and thereafter the film forming step and the secondary injection step are performed in this order.

As a result, the lamp unit 1 has the bulb 4 whose top surface is covered with the film 4c, and hence has the same color as the film 2b of the lamp main body 2. Therefore, when the lamp unit 1 is seen from outside, the sense of discomfort is never caused even if the color of the bulb 4 differs from that of the film. Additionally, since the bulb 4 is partially covered with a film 4c, the bulb 4 functions as a masking material in a shadow part formed by the film 4c, i.e., in the member incorporation portion 2a to which an electric connection is made, and the shadow part is never covered with a film. Therefore, electric insulation properties can be maintained without using a special masking material, and a short circuit is never caused. Therefore, it becomes unnecessary to attach and detach such a special masking material, and workability is thus improved.

Still additionally, the film 4c applied onto the top surface of the bulb 4 reflects light emitted from the bulb 4, and hence, even if light passes through the film 4c, this light will be weak. Light reflected by the film 4c reaches the surface of the film 2b of the lamp main body 2, is then reflected therefrom, and is used as projection light of the lamp unit 1. As a result, while the lamp unit 1 is emitting a beam of light, the region of the bulb 4 is prevented from being particularly brightened, and light projection dispersed as a whole can be performed. This is excellent in visibility.

The present invention is not limited to the above embodiment, of course. A film-provided molded piece formed by carrying out the present invention ranges dimensionally from a small-sized one, such as a vehicle side turn lamp, to a large-sized one, such as a back lamp or a front lamp. Examples of such film-provided molded pieces include an emblem, a colored lens, a number plate frame, an anticorrosion coated article, a cosmetic case, a grill, a magnetic or electromagnetic shielding product, a mirror, a garnish, an optical lens, a vehicle inner mirror, a molding, an abrasion-resistant article, a hubcap, an indoor illuminator (including a chandelier), a reflector, and a doorknob.

The present invention is useful as a film-provided molded piece used for a vehicle lamp unit or a vehicle emblem, is useful as a method for molding the film-provided molded piece, and is useful as an apparatus for molding the film-provided molded piece. Without a complex automatic machine means used to attach and detach a masking material, it is possible to perform an operation to secure the insulation properties of a member incorporation portion into which a bulb and a terminal are incorporated.

The invention claimed is:

1. A method for producing a film-provided molded piece, the method comprising:
   forming first and second molded pieces with first and second molds that are structured so that the first mold can be relatively moved in a direction receding from and proceeding to the second mold and in a direction along a mold surface,
   covering the first molded piece with a film, and
   uniting the first molded piece that is covered with the film and the second molded piece together, wherein:
      the first mold having mold faces by which the first and second molded pieces are formed;
      the second mold having mold faces by which the first and second molded pieces are formed and a film forming device used to cover the first molded piece with the film; and
      when members are incorporated into the first molded piece, the members are incorporated into the first molded piece after the first molded piece is formed but before the first molded piece is covered with the film, surfaces of the members incorporated therein are covered with films, and masking is performed by the surfaces of the members covered therewith.

2. The method for producing the film-provided molded piece according to claim 1, wherein:
   the film-provided molded piece is a lamp unit made up of a lamp main body and a lens part;
   the members are incorporated into the lamp main body;
   the member incorporated therein for masking is a bulb; and
   a masking part formed by covering a surface of the bulb with the film is at least an electric wiring part of the bulb.

3. The method for producing the film-provided molded piece according to claim 1, wherein the first molded piece is a lamp main body and the second molded piece is a lens part.

4. A film-provided molded piece formed through a primary injection step of forming first and second molded pieces by structuring first and second molds so that the first mold can be relatively moved in a direction receding from and proceeding to the second mold and in a direction along a mold surface, a secondary injection step of uniting the first and second molded pieces together, and a film forming step of covering the first molded piece with a film, the film forming step being performed between the primary injection step and the secondary injection step; the first mold having mold faces by which the first and second molded pieces are formed; the second mold having mold faces by which the first and second molded pieces are formed and a film forming device used to cover the first molded piece with the film; wherein:
   when members are incorporated into the first molded piece,
      a member incorporating step of incorporating the members into the first molded piece is performed between the primary injection step and the film forming step,
      surfaces of the members incorporated therein are covered with films, and
      masking is performed by the surfaces of the members covered therewith.

5. The film-provided molded piece according to claim 4, wherein:
   the film-provided molded piece is a lamp unit made up of a lamp main body and a lens part;
   the member incorporating step is performed to incorporate the members into the lamp main body;
   the member incorporated therein for masking is a bulb, and a masking part formed by covering a surface of the bulb with the film is at least an electric wiring part of the bulb.

6. The film-provided molded piece according to claim 4, wherein the first molded piece is a lamp main body and the second molded piece is a lens part.

* * * * *